United States Patent
Kim et al.

(10) Patent No.: US 7,860,645 B2
(45) Date of Patent: Dec. 28, 2010

(54) SYSTEM AND METHOD FOR PROVIDING TELEMATICS SERVICE

(75) Inventors: Do-Sung Kim, Seoul (KR); Won-Hee Cho, Seoul (KR); Jin-Kyung Park, Seoul (KR); In-Joon Choi, Seoul (KR); Min-Hui Park, Uijeongbu (KR)

(73) Assignee: SK Corporation, Seorin-dong, Jongro-gu, Seoul (KR)

( * ) Notice: Subject to any disclaimer, the term of this patent is extended or adjusted under 35 U.S.C. 154(b) by 643 days.

(21) Appl. No.: 11/571,383

(22) PCT Filed: Jun. 30, 2005

(86) PCT No.: PCT/KR2005/002064

§ 371 (c)(1),
(2), (4) Date: Feb. 12, 2007

(87) PCT Pub. No.: WO2006/004349

PCT Pub. Date: Jan. 12, 2006

(65) Prior Publication Data

US 2008/0275637 A1    Nov. 6, 2008

(30) Foreign Application Priority Data

Jun. 30, 2004  (KR) ...................... 10-2004-0050348

(51) Int. Cl.
*G08G 1/0968* (2006.01)
*G08G 7/78* (2006.01)
*G01C 21/00* (2006.01)

(52) U.S. Cl. ...................... 701/201; 701/117; 701/206; 701/208; 701/212; 340/989; 340/991; 340/995.1; 340/995.15; 340/995.2; 345/620

(58) Field of Classification Search ......... 701/117–124, 701/200–215, 302; 340/988–996; 455/403–420, 455/457
See application file for complete search history.

(56) References Cited

U.S. PATENT DOCUMENTS

| | | | | |
|---|---|---|---|---|
| 5,835,881 A * | 11/1998 | Trovato et al. | .............. | 701/211 |
| 5,948,040 A * | 9/1999 | DeLorme et al. | ............ | 701/201 |
| 6,259,381 B1 * | 7/2001 | Small | ......................... | 340/988 |
| 6,317,686 B1 * | 11/2001 | Ran | ........................... | 701/210 |
| 6,546,334 B1 | 4/2003 | Fukuchi | | |
| 6,567,744 B1 * | 5/2003 | Katayama et al. | ........... | 701/209 |
| 7,076,409 B2 * | 7/2006 | Agrawala et al. | .............. | 703/2 |
| 7,512,484 B2 * | 3/2009 | Furukawa | .................... | 701/200 |

(Continued)

*Primary Examiner*—Jack Keith
*Assistant Examiner*—Jonathan M Dager
(74) *Attorney, Agent, or Firm*—Lexyoume IP Group, PLLC.

(57) ABSTRACT

The telematics service providing system generates a path from the departure point to the destination based on traffic information, generates guidance information for each guidance point where a turn to a direction that is different from the current progress direction of the client is needed on the generated path, clips a vicinity map covering a predetermined area with reference to the guidance point from the total map to generate a guidance point vicinity map, converts the generated guidance point vicinity map into a format displayable by the client, and provides the converted map to the client terminal. Accordingly, confusion caused by complex crossroads or paths that need consecutive and same direction turns may be prevented, the client terminal may not need a memory for storing large-volume geographic information data, and the client may not additionally need to upgrade the geographic information data.

17 Claims, 8 Drawing Sheets

U.S. PATENT DOCUMENTS

| | | | |
|---|---|---|---|
| 2002/0091485 A1* | 7/2002 | Mikuriya et al. | 701/208 |
| 2003/0036848 A1* | 2/2003 | Sheha et al. | 701/209 |
| 2003/0182052 A1* | 9/2003 | DeLorme et al. | 701/201 |
| 2003/0191580 A1* | 10/2003 | Endo et al. | 701/202 |
| 2004/0204069 A1* | 10/2004 | Cui et al. | 455/557 |
| 2004/0204829 A1* | 10/2004 | Endo et al. | 701/202 |
| 2005/0107993 A1* | 5/2005 | Cuthbert et al. | 703/2 |
| 2005/0137791 A1* | 6/2005 | Agrawala et al. | 701/209 |
| 2005/0165543 A1* | 7/2005 | Yokota | 701/204 |
| 2005/0187711 A1* | 8/2005 | Agrawala et al. | 701/211 |
| 2005/0216186 A1* | 9/2005 | Dorfman et al. | 701/207 |
| 2005/0216193 A1* | 9/2005 | Dorfman et al. | 701/213 |
| 2005/0234639 A1* | 10/2005 | Endo et al. | 701/209 |
| 2005/0270311 A1* | 12/2005 | Rasmussen et al. | 345/677 |
| 2006/0074553 A1* | 4/2006 | Foo et al. | 701/212 |
| 2006/0184317 A1* | 8/2006 | Asahara et al. | 701/208 |
| 2006/0271287 A1* | 11/2006 | Gold et al. | 701/211 |
| 2007/0096945 A1* | 5/2007 | Rasmussen et al. | 340/995.1 |
| 2009/0143975 A1* | 6/2009 | Geelen | 701/200 |

* cited by examiner

FIG.5

1) Guidance point no: 1
2) Turn: 12 (Turn to left)
3) Crossroad title: Samgagji St.
4) Direction title: Noksapyong St.
5) Link length: 500 m
6) Link time: 60 secs
7) Link congestion: 1 (Not busy)
8) Linear road info
   - Road title: Han-kang Rd.
   - Road class: 5 (Main street)
   - Title no: 5717
   - Vertex(1): x1, y1

....

- Vertex(n): xn, yn

1) Guidance point no: 2
2) Turn: 12 (Turn to left)
3) Crossroad title: Samgagji St.
4) Direction title: Noksapyong St.
5) Link length: 700m
6) Link time: 120secs
7) Link congestion: 2 (Slow)
8) Linear road info
   - Road title: Samsung Rd.
   - Road class: 5 (Main street)
   - Title no: 5717
   - Vertex(1): x1, y1

....

- Vertex(n): xn, yn

FIG.6
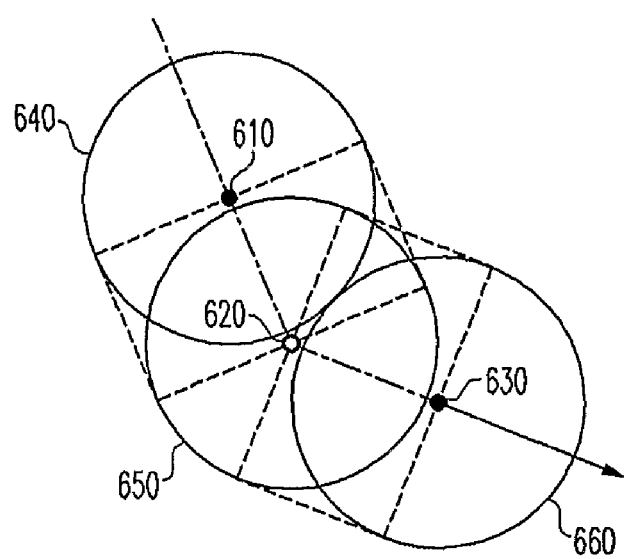
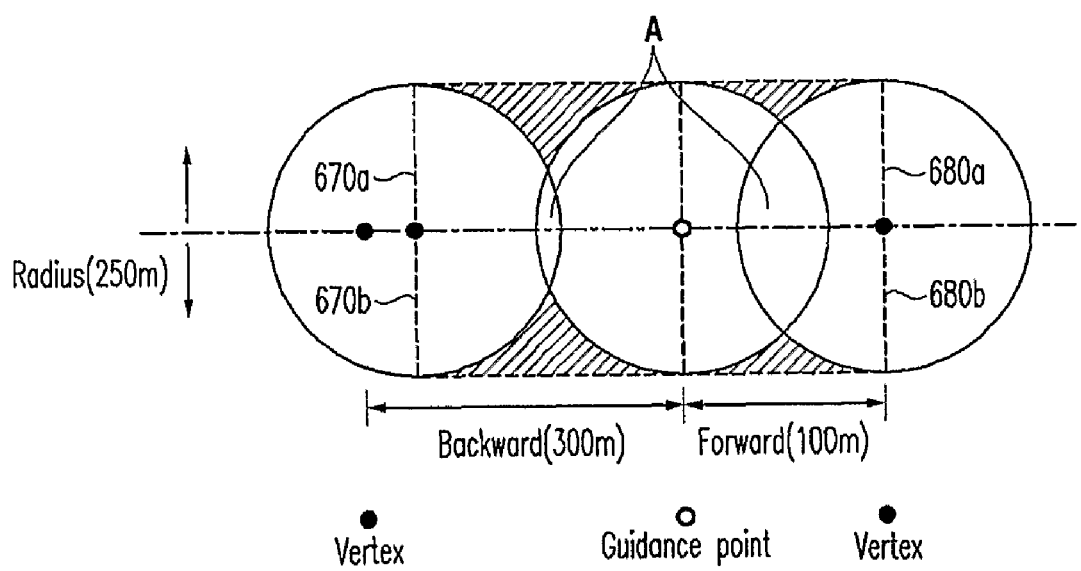

SYSTEM AND METHOD FOR PROVIDING TELEMATICS SERVICE

BACKGROUND OF THE INVENTION (a) Field of the Invention

The present invention relates to a system and method for providing telematics services.

(b) Description of the Related Art

As the telematics industry has greatly developed, the navigation system has been changed from the road guidance method by using static information to the method for providing the optimized path by applying accurate real-time traffic conditions when a user requests road guide information.

However, the vehicle navigation system requires a global positioning system (GPS), a communication device, a large-capacity storage device such as a CD-ROM and an HDD, and a large-volume of geographic information data in order to provide accurate navigation information (e.g., opening and closing of new roads, and turn information of crossroads).

The cost of the navigation system increases because of the above-noted reason, and it is difficult for a thin client that is a device having relatively little memory capacity such as a cellular phone and a PDA to provide the accurate navigation information. It is burdensome for the user to use a navigation system installed with national maps since the navigation system is very expensive in most cases.

Also, it is not easy to update varied geographic information data, and hence the user must connect the user's terminal to a PC through a wired or wireless manner and directly update the existing data with the map data stored in the terminal.

The turn-by-turn navigation system has a small or no display unit, and indicates progress directions through turn icons or voice guidance while guiding the road. However, the turn-by-turn navigation system may confuse the user at complicated crossroads or when the user must turn the progress directions consecutively.

SUMMARY OF THE INVENTION

It is an advantage of the present invention to provide a system and method for providing a telematics service for preventing confusion of progress directions at a guidance point where the user needs to turn the progress direction.

It is another advantage of the present invention to provide a system and method for providing a telematics service without storing and updating large-volume geographic information data.

In one aspect of the present invention, a telematics service providing system for providing path information from a departure point to a destination to a client terminal through a radio communication network comprises: an optimized path generator for generating a path from the departure point to the destination; a guidance information generator for generating guidance information for each guidance point where a turn to another direction that is different from the client's current progress direction is needed for the generated path; a guidance point vicinity map generator for generating a guidance point vicinity map by clipping a vicinity map covering a predetermined area with reference to the guidance point from the total map according to the generated guidance information; and a telematics service provider for providing path information including the generated guidance point vicinity map to the client terminal.

The optimized path generator generates the path by applying traffic information.

The telematics service providing system further comprises a per-type service provider for providing path information including the guidance point vicinity map and guidance information to the client terminal according to a predetermined service type.

The predetermined service type comprises at least one of: a first type for providing path information from the departure to the destination based on a turn by turn (TBT) method including a direction turn icon; a second type for providing vicinity maps of the departure and the destination, and providing residual path information based on the TBT method; a third type for providing vicinity maps of the departure and the destination, and selectively providing the guidance point vicinity map, and providing path information based on the TBT method to residual paths; and a fourth type for providing vicinity maps of the departure point and the destination and the guidance point vicinity map.

In another aspect of the present invention, a telematics service providing method for providing path information from a departure point to a destination to a client terminal through a radio communication network, comprises: generating a path from the departure point to the destination; generating guidance information for each guidance point where a turn to another direction that is different from the client's current progress direction is needed for the generated path; generating a guidance point vicinity map by clipping a vicinity map covering a predetermined area with reference to the guidance point from the total map according to the generated guidance information; and providing path information including the generated guidance point vicinity map to the client terminal.

BRIEF DESCRIPTION OF THE DRAWINGS

FIG. 5 shows guidance information for each guidance point according to an embodiment of the present invention.

FIG. 6 shows a process for generating a guidance point vicinity map according to an embodiment of the present invention.

DETAILED DESCRIPTION OF THE ILLUSTRATED EMBODIMENTS

Figure 1:
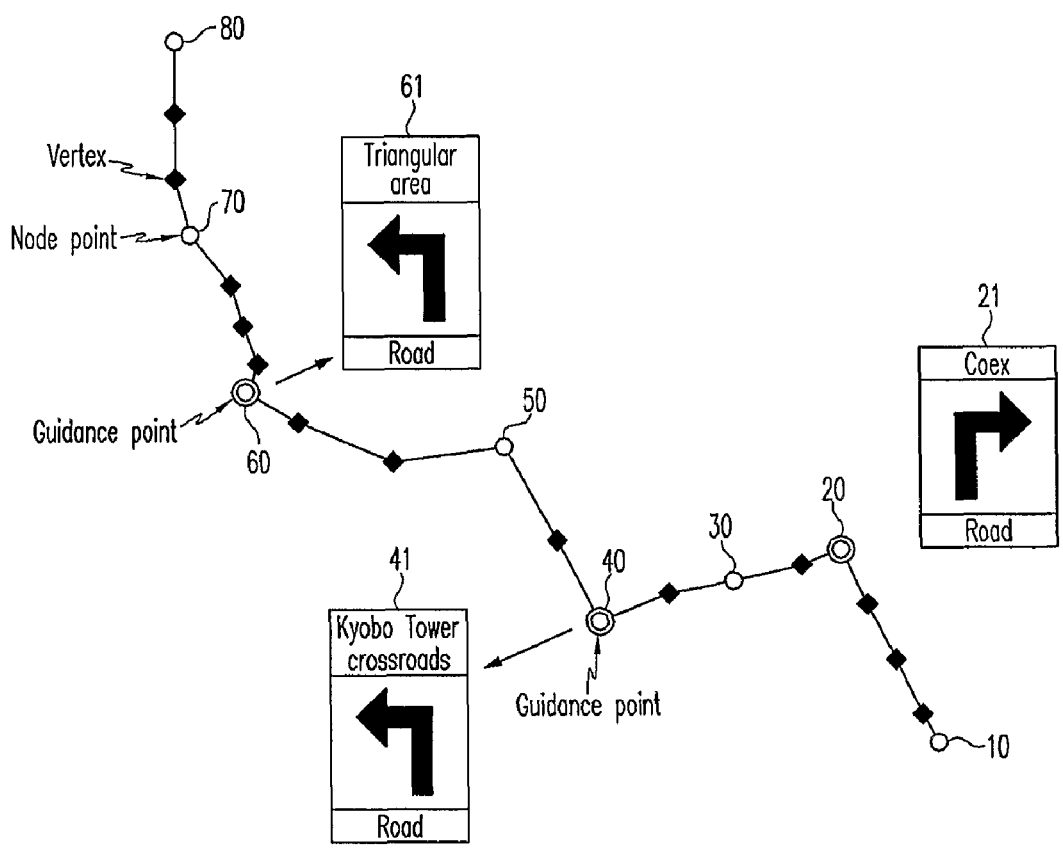
FIG. 1 shows path data according to an embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

In the embodiment, nodes represent important points on the road including crossroads and junctions of roads, and links indicate connection states between the nodes. Also, paths represent a set of links from departure nodes to destination nodes, and guidance points indicate nodes that require a direction turn (turn right or turn left) in the current progress direction from among the nodes on the path.

FIG. 1 shows path data according to an embodiment of the present invention.

FIG. 1 shows a path from the node 10 to the node 80, and the nodes 20, 40, and 60 are guidance points. The turn-by-turn (TBT) screens 21, 41, and 61 are images provided for path guidance by a TBT navigation system.

Figure 2:
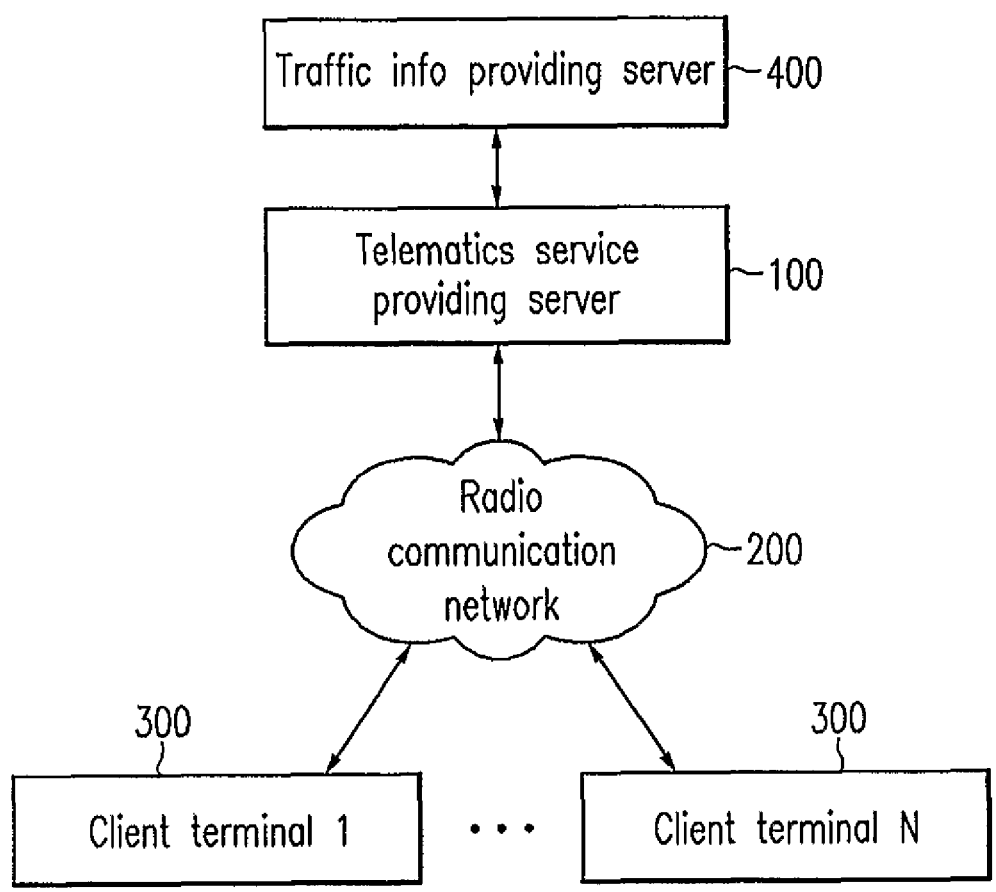
FIG. 2 is a block diagram for a telematics service providing system according to an embodiment of the present invention.

FIG. 2 is a block diagram for a telematics service providing system according to an embodiment of the present invention.

As shown, the telematics service providing system includes a telematics service providing server 100, a radio communication network 200, a client terminal 300, and a traffic information providing server 400.

The telematics service providing server 100 is connected to a plurality of client terminals 300 through the radio communication network 200, and is also connected to the traffic information providing server 400 for providing traffic situations for respective locations in real-time. The telematics service providing system may not include the traffic information providing server 400 when not applying traffic information while providing the telematics service.

The telematics service providing server 100 receives real-time traffic information for each link from the traffic information providing server 400, and applies the received real-time traffic information to the current traffic information to generate an optimized path.

The telematics service providing server 100 generates guidance information on the generated optimized path by referring to a related map. In this instance, the generated guidance information includes proper names of the guidance points, crossroad titles, direction titles, and linear road information for each link, and the linear road information includes a list of a road title, a road class, and a vertex.

The telematics service providing server 100 clips a guidance point vicinity map from the total map according to the generated guidance information. In this instance, the telematics service providing server 100 clips the guidance point vicinity map with reference to guidance point vicinity vertexes and a guidance point, and the vertexes are defined to be points provided before the guidance point by 100 meters and a point provided after the guidance point by 300 meters with respect to the progress direction.

Therefore, the telematics service providing server 100 clips areas having a radius of 250 meters with reference to the guidance points and the vertexes from the total map.

Further, the above-noted radius size and the clipping method are varied depending on the client terminal and the client's user conditions.

The telematics service providing server 100 converts the clipped guidance point vicinity map and the vicinity maps of the departure point and the destination into the data format of the client terminal 300, and provides the converted maps to the client terminal 300 through the radio communication network 200. In this instance, the provided vicinity maps of the departure point and the destination are connected with at least one link.

The radio communication network 200 may be a CDMA network, a wireless LAN, a portable Internet, or other types of radio communication networks for transmitting and receiving digital information. The client terminal 300 is a terminal having display means such as an LCD, including a mobile phone and a notebook computer.

The client terminal 300 displays the provided guidance point vicinity map and the vicinity maps of the departure point and the destination on a terminal monitor, and provides a guidance broadcast if needed. For example, the client terminal 300 guides the path through a TBT screen including a direction turn icon when the first guidance point is distant from the departure point, and the client terminal 300 displays a guidance point vicinity map and provides a speech guide when approaching the first guidance point vicinity.

As described, the telematics service providing server 100 provides detailed vicinity maps for each guidance point to the client terminal 300 when providing the optimized path from the departure point to the destination, and hence confusion by the client caused by busy crossroads or roads that need consecutive direction turns may be prevented.

Also, the client terminal 300 may not have an additional memory device for storing large-volume geographic information data, which prevents an increase of production cost of the client terminal. Further, the client terminal 300 may not perform an additional operation for upgrading the geographic information data.

When the path search from the departure point to the destination is repeated because the client terminal 300 frequently digresses from the path, the telematics service providing server 100 provides the client terminal 300 with residual vicinity maps excluding the part that corresponds to the vicinity map of the guidance point provided to the client terminal 300.

The client terminal 300 displays a guidance point vicinity map and vicinity maps of the departure point and the destination by reusing the stored vicinity map, which saves communication fees to be paid by the client.

Also, the telematics service providing server 100 classifies the telematics services according to respective types, and provides them. The first service type is a TBT-based service providing method including a direction turn icon when providing the path from the departure point to the destination, which prevents the increase of communication fees caused by receiving the guidance point vicinity map.

The second service type is a method for providing vicinity maps of the departure point and the destination and applying the TBT service to the residual path, the third service type is a method for providing vicinity maps of the departure point and the destination, and selectively providing a guidance point vicinity map and applying the TBT service to the residual path, and the fourth service type is a method for providing vicinity maps of the departure point, the destination, and the guidance points.

The embodiment may have other service types in addition to the above-described service types.

The telematics service providing server 100 provides the telematics service following various service providing methods to the client terminal 300 to thereby increase the user's service satisfaction.

A detailed configuration of the telematics service providing system will now be described with reference to FIG. 3.

Figure 3:
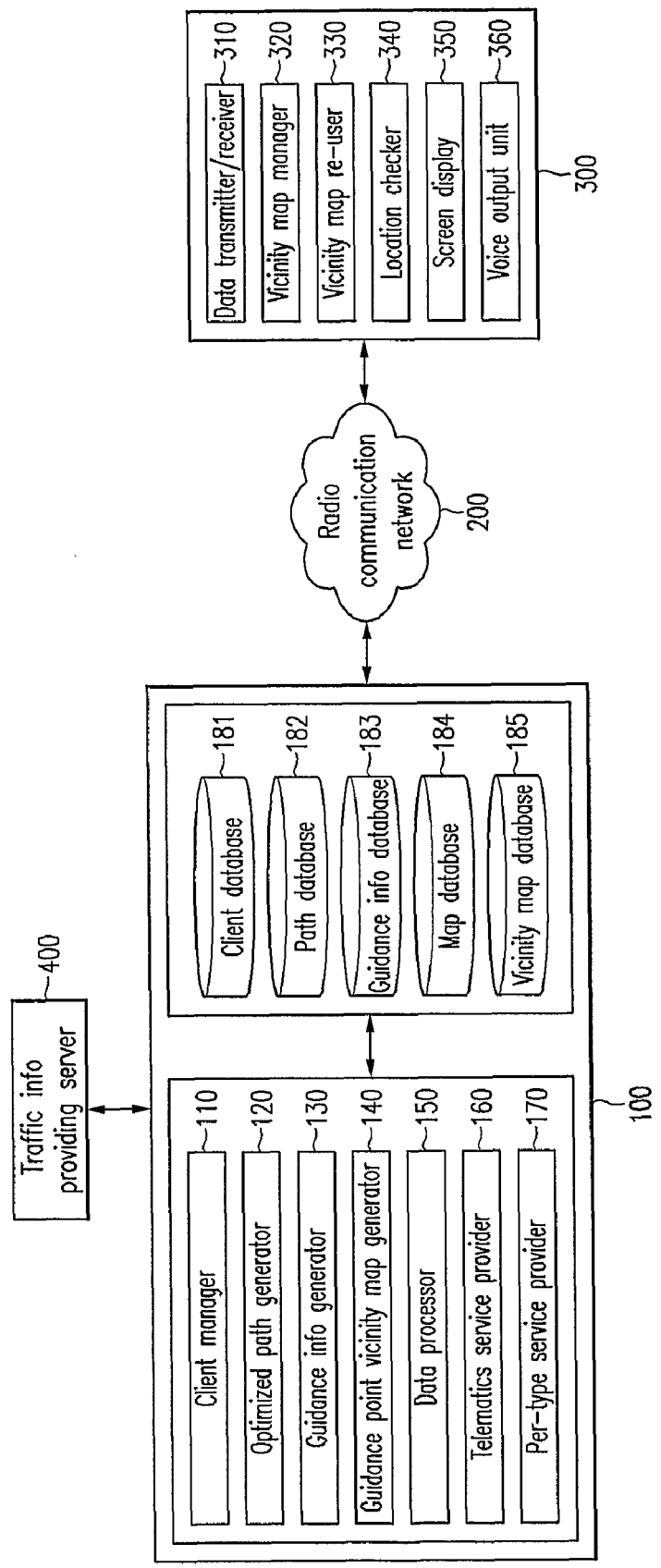
FIG. 3 is a detailed block diagram for a telematics service providing system according to an embodiment of the present invention.

FIG. 3 is a detailed block diagram for a telematics service providing system according to an embodiment of the present invention.

As shown, the telematics service providing server 100 includes a client manager 110, an optimized path generator 120, a guidance information generator 130, a guidance point vicinity map generator 140, a data processor 150, a telematics service provider 160, and a per-type service provider 170, and further includes a client database 181, a path database 182, a guidance information database 183, a map database 184, and a vicinity map database 185.

The client terminal 300 includes a data transmitter/receiver 310, a vicinity map manager 320, a vicinity map reuser 330, a location checker 340, a screen display 350, and a voice output unit 360.

In detail, the client manager 110 manages client-related tasks including tasks for storing, adding, and deleting information on registered members, and a task for determining membership through information search.

The optimized path generator 120 generates the optimized path from the departure point to the destination, requested by the client, based on the respective links' traffic information.

The guidance information generator 130 generates guidance information on the generated optimized path by referring to a related map, and the guidance information generated in this instance includes a proper number (a node ID or x and y coordinate values of the guidance point) for each guidance point, a crossroad title, a direction title, and per-link linear road information.

The guidance point vicinity map generator 140 generates a guidance point vicinity map by clipping the guidance point vicinity map from the total map database according to the generated guidance information.

That is, the guidance point vicinity map generator 140 generates a guidance point vicinity map by clipping the areas having the radius of 250 meters with reference to the guidance point and the vertexes from the total map. The vertexes are predefined by the guidance information generator 130 to be a point provided before the guidance point by 100 meters and a point provided after the guidance point by 300 meters with respect to the progress direction.

The guidance point vicinity map generator 140 generates a link for connecting the respective guidance points together with the vicinity maps of the departure point and the destination.

The data processor 150 converts the generated vicinity maps of the guidance point, the destination, and the departure point into a data format to be normally displayed by the client terminal.

The telematics service provider 160 provides the vicinity maps of the guidance point, the destination, and the departure point following the converted data format to the client terminal 300 through the radio communication network 200.

When the client requests a service, the telematics service provider 160 determines whether the service request is an initial request for a specific path or a repeated request, and when the service request is found to be a repeated request caused by the client's frequent digression from the path, the telematics service provider 160 provides a residual vicinity map excluding the part that corresponds to the vicinity map of the guidance point already provided to the client terminal 300.

In this instance, the telematics service provider 160 determines whether repeated guidance points are found according to the proper numbers of the guidance points received from the client terminal 300.

Also, the telematics service provider 160 initially provides path information to the client terminal 300, and provides updated path information to the client terminal 300 according to request by the client or automatically when it is found that the optimized path to the destination is changed because of the traffic conditions that change in real-time.

The per-type service provider 170 classifies the telematics services according to the embodiment by respective service types that includes a method for providing a TBT-based service only including a direction turn icon and a method for providing vicinity maps of the departure point, the destination, and the guidance points.

The client database 181 stores information on the clients and client terminals.

The path database 182 stores the optimized paths from the same departure point to the destination and related information that includes opening and closing of new roads and turn information of crossroads.

The guidance information database 183 stores guidance information (e.g., crossroad titles of guidance points, direction titles, and per-link linear road information) generated according to the related map for the respective optimized paths.

The map database 184 stores digital map information in which new road information or upgraded road information is periodically updated.

The vicinity map database 185 stores guidance point vicinity map provided to the client terminal 300 and related information.

The data transmitter/receiver 310 of the client terminal 300 controls data communication with the telematics service providing server 100 through the radio communication network 200.

That is, the data transmitter/receiver 310 receives path information requested by the client from the telematics service providing server 100, or transmits telematics service related data (including titles of a departure point and a destination, and proper numbers of guidance points) to the telematics service providing server 100.

The vicinity map manager 320 stores respective guidance point vicinity maps and guidance point proper numbers from among the data transmitted by the telematics service providing server 100 in a memory, and manages them.

When at least one guidance point in the path information requested by the client is repeated with a guidance point requested in advance, the vicinity map reuser 330 receives vicinity maps of residual guidance points excluding repeated guidance points from the telematics service providing server 100, and generates total path information by reusing a repetition vicinity map provided and stored in the memory.

Accordingly, the vicinity map reuser 330 reduces data usage fees as the number of uses of the telematics service is increased, and deletes the guidance point vicinity map stored in the memory if needed or according to request by the client.

The location checker 340 checks the location of the client terminal 300 in real-time through a global positioning system (GPS) and requests a service again due to the digression of path.

The screen display 350 displays vicinity maps of the guidance points, the departure point, and the destination, and guidance information provided by the telematics service providing server 100 on the terminal monitor.

The voice output unit 360 outputs speech for path guidance to the terminal speaker.

An operation of the telematics service providing system will now be described.

Figure 4:
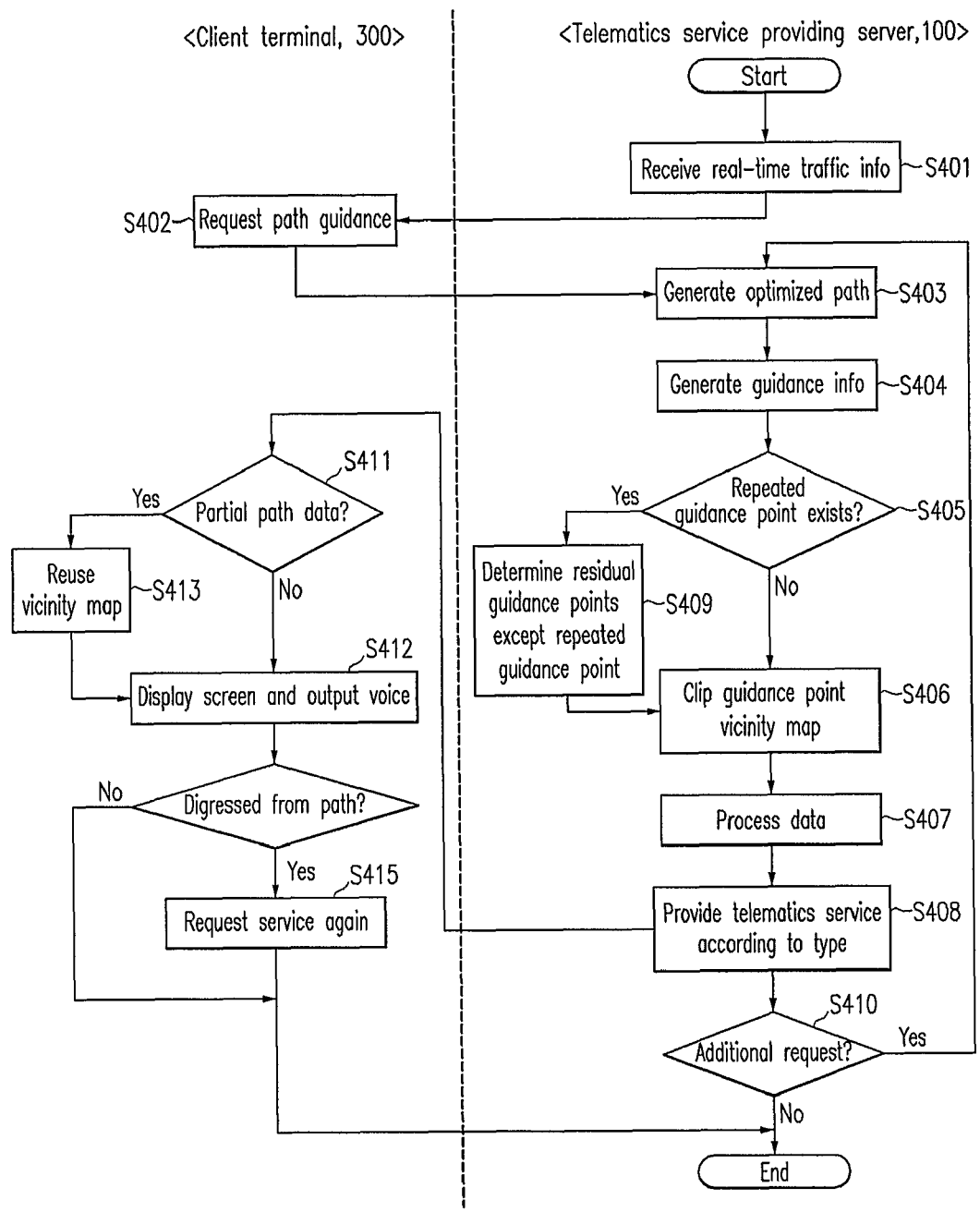
FIG. 4 is a flowchart for an operation by the telematics service providing system.

FIG. 4 is a flowchart for an operation by the telematics service providing system.

As shown, the optimized path generator 120 receives real-time traffic information for respective areas from the traffic information providing server 400 in step S401, and when the optimized path generator 120 receives a path guidance request from the client terminal 300 in step S402, the optimized path generator 120 generates the optimized path from the requested departure point to the destination by referring to the real-time traffic information in step S403.

That is, the optimized path generator 120 generates the optimized path from the departure point to the destination excluding a path that is close but has very complicated traffic conditions and a path that is very far.

The client inputs a path guidance request by inputting his voice to the terminal, searching titles, or inputting the destination, and the embodiment may request the path guidance by using other methods.

The guidance information generator 130 generates guidance information on the optimized path for each guidance point by referring to the map of the corresponding area in step S404, and in this instance, the generated guidance information includes proper numbers of the respective guidance points, turn types, crossroad titles, direction titles, and per-link linear road information, which are shown in FIG. 5.

FIG. 5 shows guidance information for each guidance point according to an embodiment of the present invention.

As shown, the guidance information generator 130 generates guidance information for each guidance point, and in this instance, the linear road information for each link shown by 8) includes a road title, a road class, a title number, and a vertex list, and the turn type is generated based on the map linearity and angles.

In addition, guidance information for each guidance point may further include additional information including a CCTV screen number, a speeding prevention area, and a multiple accident area.

The telematics service provider 160 checks whether the generated guidance information has a proper number that corresponds to the guidance point proper name provided to the client terminal 300 in step S405.

When no corresponding guidance point proper number is found, the guidance point vicinity map generator 140 clips a guidance point vicinity map from the total map according to each guidance information to thus generate the guidance point vicinity map in step S406, which will now be described with reference to FIGS. 6 and 7.

FIG. 6 shows a process for generating a guidance point vicinity map according to an embodiment of the present invention.

As shown, the guidance point vicinity map generator 140 respectively clips a vicinity map in the format of circles 640, 650, and 660 having the radius of 250 meters from the total map with reference to the guidance point 620 and the vertexes 610 and 630. In this instance, the vertexes are defined to be points provided before the guidance point 620 by 100 meters and a point provided after the guidance point 620 by 300 meters with respect to the progress direction. The distances of 100, 250, and 300 meters are variable depending on the user conditions and the geographic conditions.

The guidance point vicinity map generator 140 temporally stores the clipped areas 640, 650, and 660 in the vicinity map database 185, and in this instance, the superimposed parts depicted as A are eliminated and stored without repeated elimination.

The above-described clipping in the circular format with respect to the guidance point 620 and the vertexes 610 and 630 provides valley pattern spaces (given by slash marks), and the vicinity map is additionally clipped so as to obtain map information on the spaces.

The guidance point vicinity map generator 140 defines the distances between the vertexes 610 and 630 and the guidance point 620 to be a horizontal side and the distance corresponding to the radius of 250 meters to be vertical sides 670a, 670b, 680a, and 680b to generate a square (given by dotted lines) and clip the total map, and eliminate the superimposed parts without repetition from among the clipped area and store the superimposed parts in the vicinity map database 185. As a result, the guidance point vicinity map generator 140 minimizes the data for the guidance point vicinity map and maximizes the map size displayed on the client terminal 300.

Figure 7:
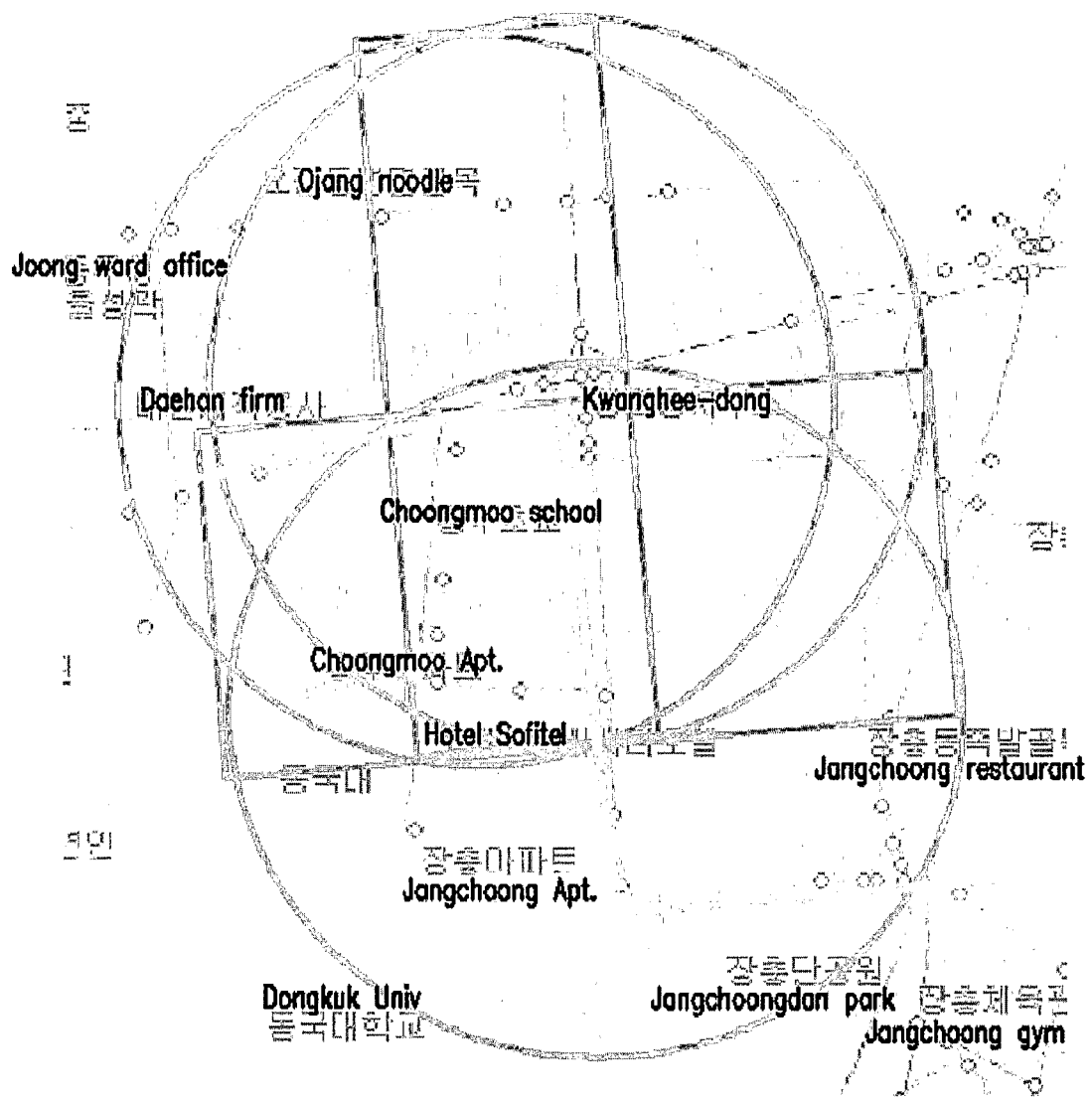
FIG. 7 shows a guidance point vicinity map displayed on a client terminal according to an embodiment of the present invention.

FIG. 7 shows a guidance point vicinity map displayed on a client terminal according to an embodiment of the present invention.

As shown, the guidance point vicinity map has an image format given by magnifying the desired location of the vicinity map at which the client needs a direction turn, and hence the client may accurately know the progress direction.

The data processor 150 converts the guidance vicinity map and the vicinity maps of the departure point and the destination into a data format displayable by the client terminal in step S407, and the telematics service provider 160 provides converted path information to the client terminal 300 through the radio communication network 200 in step S408.

In this instance, the per-type service provider 170 classifies the converted path information according to the types and provides classified path information according to the client's requests, and the service type includes the TBT method including the direction turn icon and the method for providing vicinity maps of the departure point, the destination, and the guidance points.

When determining that repeated guidance points are found because of the client's frequent digression from the path, the telematics service provider 160 provides the client terminal 300 with the residual vicinity map excluding the part that corresponds to the guidance point vicinity map provided to the client terminal 300 in step S409 through the above-described steps S406 to S408.

The telematics service providing server 100 checks whether the client terminal 300 requests an additional service in step S410, repeats the above-noted operations when the additional service is requested by the client terminal 300, and terminates the operation when no additional service is requested.

The vicinity map reuser 330 of the client terminal 300 parses the data provided by the telematics service provider 160 to check whether an omitted guidance point vicinity map is found in step S411, and provides normal path guidance by reusing the provided guidance point vicinity map in step S413 when the omitted vicinity map is found. A displayed example for the guidance is illustrated in FIG. 8.

Figure 8:
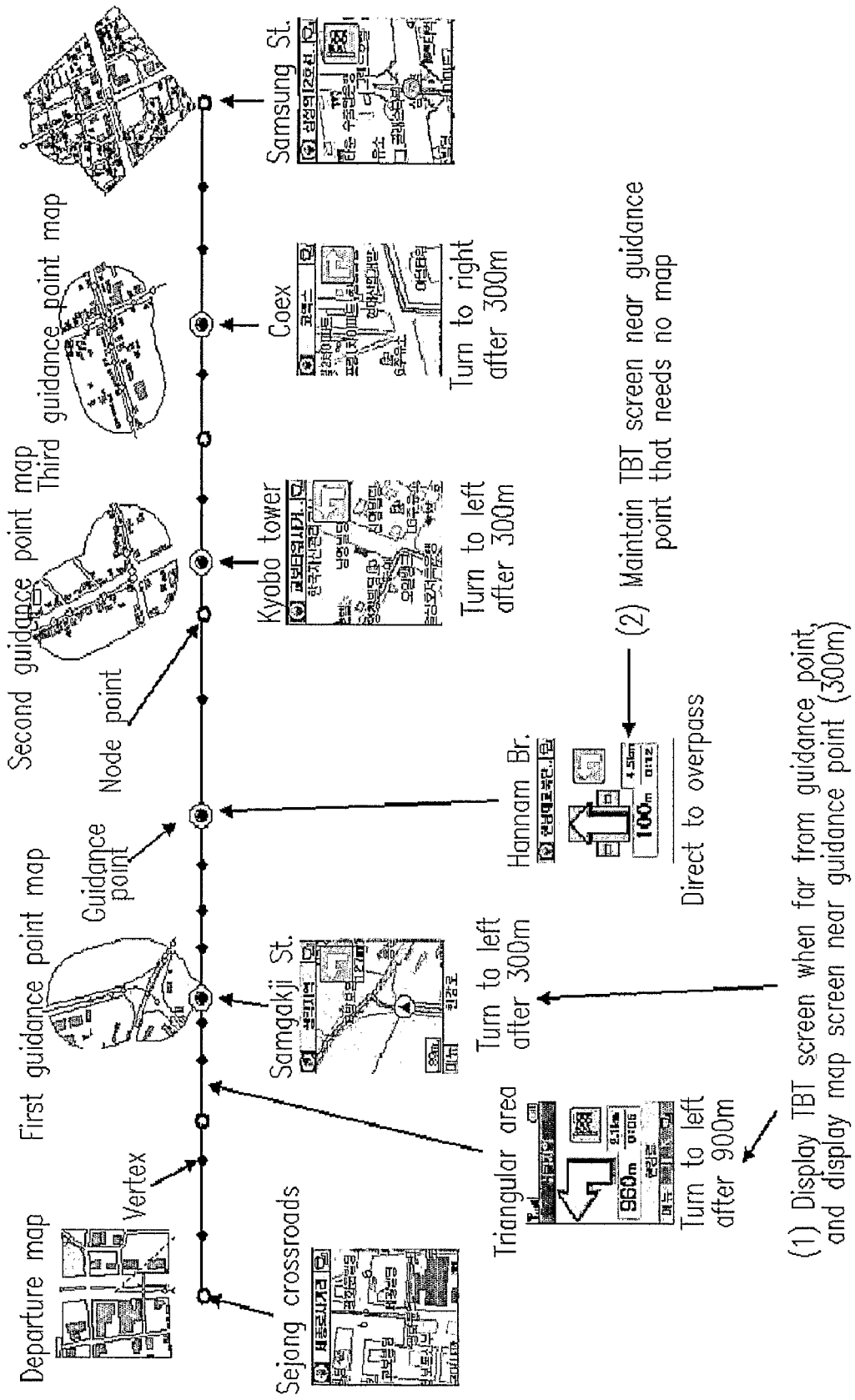
FIG. 8 shows other guidance point vicinity maps displayed on a client terminal according to an embodiment of the present invention.

FIG. 8 shows other guidance point vicinity maps displayed on a client terminal according to an embodiment of the present invention.

As shown, the screen display 350 of the client terminal 300 displays path data that combines the reused guidance point vicinity map and the guidance point vicinity map provided by the telematics service provider 160.

The voice output unit 360 outputs a TBT screen guide and a guide broadcast shown by (1) when the guidance point is far, and the screen display 350 displays the TBT screen for the guidance point (e.g., an overpass) that needs no vicinity map.

The location checker 340 checks in real-time the current location of the vehicle that carries the client terminal 300 by using a GPS, and requests the path guidance again in step S415 when the vehicle is found to have digressed from the path, or requests the same according to the client's selection.

As described, the telematics service providing system and method according to the embodiment provides detailed vicinity maps for each guidance point when providing the optimized path to the destination requested by the client, and hence the client may in advance escape the confusion caused by complex crossroads or paths that need consecutive and same direction turns.

Also, it is not necessary for the client terminal to have an additional memory for storing large-volume geographic information data, and it is not required for the client to perform additional processes for upgrading the geographic information data.

According to the present invention, the client may in advance escape the confusion caused by the complex crossroads or paths that need consecutive and same direction turns by providing detailed vicinity maps of the guidance points when providing the path information from the departure point to the destination requested by the client.

Further, when the path search to the destination is repeated, the service usage fees are saved by providing the client terminal with the residual vicinity map excluding the part that corresponds to the guidance point vicinity map provided to the client terminal.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A telematics service providing system for providing path information from a departure point to a destination to a client terminal through a radio communication network, comprising:
   a map database for storing total map information;
   an optimized path generator for generating a path from the departure point to the destination;
   a guidance information generator for generating guidance information for each guidance point where a turn to another direction that is different from the client's current progress direction is needed for the generated path;
   a guidance point vicinity map generator for generating a guidance point vicinity map that is generated by clipping a vicinity map covering a predetermined area with reference to the guidance point from the total map stored in the map database according to the generated guidance information; and
   a telematics service provider for providing path information including the generated guidance point vicinity map to the client terminal and excluding a superimposed guidance point vicinity map provided to the client terminal,
   wherein the guidance point vicinity map generator is configured to generate the guidance point vicinity map for the guidance point by clipping a vicinity map including a first area covering a first circle area having a predetermined radius from the guidance point, a second area covering a second circle area having the predetermined radius from a first vertex that is distant with a predetermined distance from the guidance point in a forward direction and a third area covering a third circle area having the predetermined radius from a second vertex that is distant with a predetermined distance from the guidance point in a backward direction.

2. The telematics service providing system of claim 1, wherein the optimized path generator generates the path by applying traffic information.

3. The telematics service providing system of claim 1, further comprising a per-type service provider for providing path information including the guidance point vicinity map and guidance information to the client terminal according to a predetermined telematics service type.

4. The telematics service providing system of claim 3, wherein the predetermined telematics service type comprises at least one of:
   a first type for providing path information from the departure point to the destination based on a turn by turn (TBT) method including a direction turn icon;
   a second type for providing vicinity maps of the departure point and the destination, and providing residual path information based on the TBT method;
   a third type for providing vicinity maps of the departure point and the destination, and selectively providing the guidance point vicinity map, and providing path information based on the TBT method to residual paths; and
   a fourth type for providing vicinity maps of the departure point and the destination and the guidance point vicinity map.

5. The telematics service providing system of claim 1, wherein the telematics service provider provides path information including the generated guidance point vicinity map and a proper number corresponding to the generated guidance point vicinity map to the client terminal, and determines whether the guidance point vicinity map provided to the client terminal is superimposed by using the proper number.

6. The telematics service providing system of claim 5, wherein the client terminal comprises:
   a vicinity map manager for managing the guidance point vicinity map and the proper number provided through the radio communication network;
   a vicinity map reuser for reusing the guidance point vicinity map received in advance and generating total path information based on the proper number;
   a screen display for displaying the generated path information on a monitor of the client terminal; and
   a voice output unit for outputting speech broadcast related to provision of the generated path information.

7. The telematics service providing system of claim 6, wherein the vicinity map reuser deletes or stores the guidance point vicinity map and the proper number provided through the radio communication network according to the client's request.

8. The telematics service providing system of claim 1, wherein the guidance information comprises proper numbers of the respective guidance points, turn types, crossroad titles, direction titles, and per-link linear road information, and the per-link linear road information includes at least one of a road title, a road class, a title number, and a vertex list.

9. The telematics service providing system of claim 1, wherein when it is determined that the path from the current location to the destination is changed from among the path information provided to the client terminal, the telematics service provider provides information on the checked path to the client terminal according to the client's request.

10. The telematics service providing system of claim 1, wherein the telematics service providing system comprises:
    a path database for storing path information including opening and closing of new roads and turn information of crossroads;
    a guidance information database for storing information related to the generated guidance information;
    a map database for storing map information including national maps and other nations' maps; and
    a vicinity map database for storing information related to the generated guidance point vicinity map.

11. A telematics service providing method for providing path information from a departure point to a destination to a client terminal through a radio communication network, comprising:
- a) generating a path from the departure point to the destination;
- b) generating guidance information for each guidance point where a turn to another direction that is different from the client's current progress direction is needed for the generated path;
- c) generating a guidance point vicinity map by clipping a vicinity map covering a predetermined area with reference to the guidance point from a total map stored in a map database according to the generated guidance information;
- d) providing path information including the generated guidance point vicinity map to the client terminal and excluding a superimposed guidance point vicinity map provided to the client terminal; and
- e) generating the guidance point vicinity map for the guidance point by clipping a vicinity map including a first area covering a first circle area having a predetermined radius from the guidance point, a second area covering a second circle area having the predetermined radius from a first vertex that is distant with a predetermined distance from the guidance point in a forward direction and a third area covering a third circle area having the predetermined radius from a second vertex that is distant with a predetermined distance from the guidance point in a backward direction.

12. The telematics service providing method of claim 11, wherein a) comprises generating the path by applying traffic information.

13. The telematics service providing method of claim 11, wherein c) comprises generating vicinity maps of the departure point and the destination by clipping a vicinity map covering a predetermined area with reference to the departure point and the destination from the total map.

14. The telematics service providing method of claim 13, wherein d) comprises providing path information including the generated guidance point vicinity map to the client terminal by using at least one type of:
- a first type for providing path information from the departure point to the destination based on a turn by turn (TBT) method including a direction turn icon;
- a second type for providing vicinity maps of the departure point and the destination, and providing residual path information based on the TBT method;
- a third type for providing vicinity maps of the departure point and the destination, and selectively providing the guidance point vicinity map, and providing path information based on the TBT method to residual paths; and
- a fourth type for providing vicinity maps of the departure point and the destination and a guidance point vicinity map.

15. The telematics service providing method of claim 11, wherein d) comprises providing a proper number corresponding to the guidance point together with the guidance point vicinity map to the client terminal.

16. The telematics service providing method of claim 15, wherein d) comprises:
- checking whether a guidance point that is repeated with the guidance point provided to the client terminal is found on the path to the destination by using the proper number; and
- providing vicinity maps of residual points excluding the vicinity map of the repeated guidance point together with respective proper numbers to the client terminal.

17. The telematics service providing method of claim 11, wherein d) comprises:
- checking a traffic condition on the path information provided to the client terminal; and
- providing guidance information on a checked path to the client terminal according to the client's request when it is checked that the path from the location where the client terminal is provided to the destination is changed according to the traffic condition.

* * * * *